No. 683,900. Patented Oct. 8, 1901.
H. A. BLANCHARD.
HAT SEWING MACHINE.
(Application filed June 24, 1896. Renewed Feb. 28, 1901.)
(No Model.) 7 Sheets—Sheet 1.

Witnesses.
George F. Godley
J. H. Jenkins

Inventor.
Helen A. Blanchard
by Homer A. Hart atty

No. 683,900. Patented Oct. 8, 1901.
H. A. BLANCHARD.
HAT SEWING MACHINE.
(Application filed June 24, 1896. Renewed Feb. 28, 1901.)
(No Model.) 7 Sheets—Sheet 2.

No. 683,900. Patented Oct. 8, 1901.
H. A. BLANCHARD.
HAT SEWING MACHINE.
(Application filed June 24, 1896. Renewed Feb. 28, 1901.)
(No Model.) 7 Sheets—Sheet 6.

Witnesses.
George F. Godley
J. H. Jenkins

Inventor.
Helen A. Blanchard
by
Homer A. Herr
atty

No. 683,900. Patented Oct. 8, 1901.
H. A. BLANCHARD.
HAT SEWING MACHINE.
(Application filed June 24, 1896. Renewed Feb. 28, 1901.)
(No Model.) 7 Sheets—Sheet 7.

Witnesses.
George F. Godley
L. H. Jenkins

Inventor:
Helen A. Blanchard
by
Homer A. Howe
atty.

UNITED STATES PATENT OFFICE.

HELEN A. BLANCHARD, OF PORTLAND, MAINE.

HAT-SEWING MACHINE.

SPECIFICATION forming part of Letters Patent No. 683,900, dated October 8, 1901.

Application filed June 24, 1896. Renewed February 28, 1901. Serial No. 49,297. (No model.)

*To all whom it may concern:*

Be it known that I, HELEN A. BLANCHARD, a citizen of the United States, residing at Portland, in the county of Cumberland and State of Maine, have invented certain new and useful Improvements in Sewing-Machines for Sewing Sweat-Bands to Hats; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to sewing-machines; and it consists of special features fully set forth in the following specification and accompanying drawings, forming part thereof. It belongs to special machines in that class and has for its specific object the sewing of sweat-bands to the reed-holders of hats.

One of the objects of my invention is to accomplish this function without having the needle penetrate the fabric of the hat, as this would be fatal to its practicability or commercial adoption. As is well known in the art of manufacturing hats, the sweat-band is held to the inner side of the crown through the intermediary of a small strip of thin linen, silk, or other fabric. This fabric carries or supports a light stiffening-rod, of steel or reed, and this reed, with its fabric-holder, is basted to the upper edge of the inner face of the hat-crown. While the aforesaid stiffening-rod can be made of light steel or be a reed proper, yet for the purpose of this specification I will term it the "reed" and the supporting fabric therefor the "reed-holder." The distinct and specific object of my invention is to sew the said sweat-band to this reed-holder after the reed-holder and reed have been basted to the crown of the hat in the manner herein contemplated and to form an overseam-stitch around the reed while accomplishing this result.

A feature of my invention in the forming of this overseam-stitch and the sewing thereby of the band to the reed-holder is the employment of a single thread and two reciprocating thread-catching and thread-releasing needles. The thread is held continuously by the presser-feet in the path of the needles as they descend and is gripped by an offset carried by the needles prior to their penetrating the fabric. A spring-finger carried by the needles contacts with a cone-shaped eye or hole in the presser-feet, and thereby forces the point of the said finger in impingement with the needle. The thread previous to this impingement has been caught by the aforementioned offset in the needle. A thread-retaining eye is thus temporarily formed near the point of the needle. This needle-eye retains the thread until the function of looping is in progress, whereupon, the machine being properly timed, the needles are withdrawn from their respective eyes in their respective presser-feet, thread is shed by the needles in predetermined order, loop formed by the rotating looper, take-up operated, and overseam completed, all of which will be described more fully and at length hereinafter.

A further feature of my invention is a reed-guiding presser-foot whereby the reed is held at a uniform distance from my band-penetrating needle, thereby insuring a uniformity in my overseam. As both needles grip the thread on their downward motion and release it on their upward stroke, the presser-feet are of course both provided with cone-shaped eyes, as has been intimated. My vertical presser-foot is provided with thread-guiding slots and suitable thread-holders. This is the sweat-band presser-foot, and it also carries a thread-retaining groove on its contact-face with the band, thus preventing the rolling of the thread under the said presser-foot as the band is intermittently fed forward between the formation of the overseam and stitches.

A still further feature of my invention is my individual hat and sweat band feeds. These feeds are independent, but they are actuated simultaneously in both their gripping and feeding movements.

A fourth feature of my invention is in mounting the looper and its immediate and local actuating mechanism and the said feeds and their immediate actuating mechanism on a supplemental oscillating standard. This standard is pivoted to the main supporting-standard for the mechanism of the machine and during the operation of sewing is located within the hat. While the looper and the band and hat feeds are carried on a pivotally-movable standard, they are nevertheless so arranged that none of the parts can possibly be thrown out of time while swinging the said mechanism out of its normal position, which is done every time a hat is inserted in the machine. The needle employed in my machine is the same as that set forth in my Patent No. 612,011, granted October 11, 1898, for improvements in sewing-machine needles.

In the drawings like parts are referred to by marks or figures of a corresponding kind in the different views.

Fig. 10 is a plan thereof and a section on line $x x$ of Fig. 9. The band-feed, hat-feed, as well as band-plate and hat-guide 85, are shown in this view in their proper positions. Fig. 21½ is a plan of the arm carried by the band presser-foot for swinging the spool end of the thread to the twenty-degree needle. Fig. 21¾ is a transverse section on the line $w w$, Fig. 24, showing the cam on the rod $n^5$ for actuating the thread-swinging arm.

1 is the prime shaft of my machine. At its one end it carries a balance-wheel $C^3$ and belt-wheel $C^4$, which belt-wheel is actuated by some primary source of power.

Figures 4, 5, 6, 7, 8:
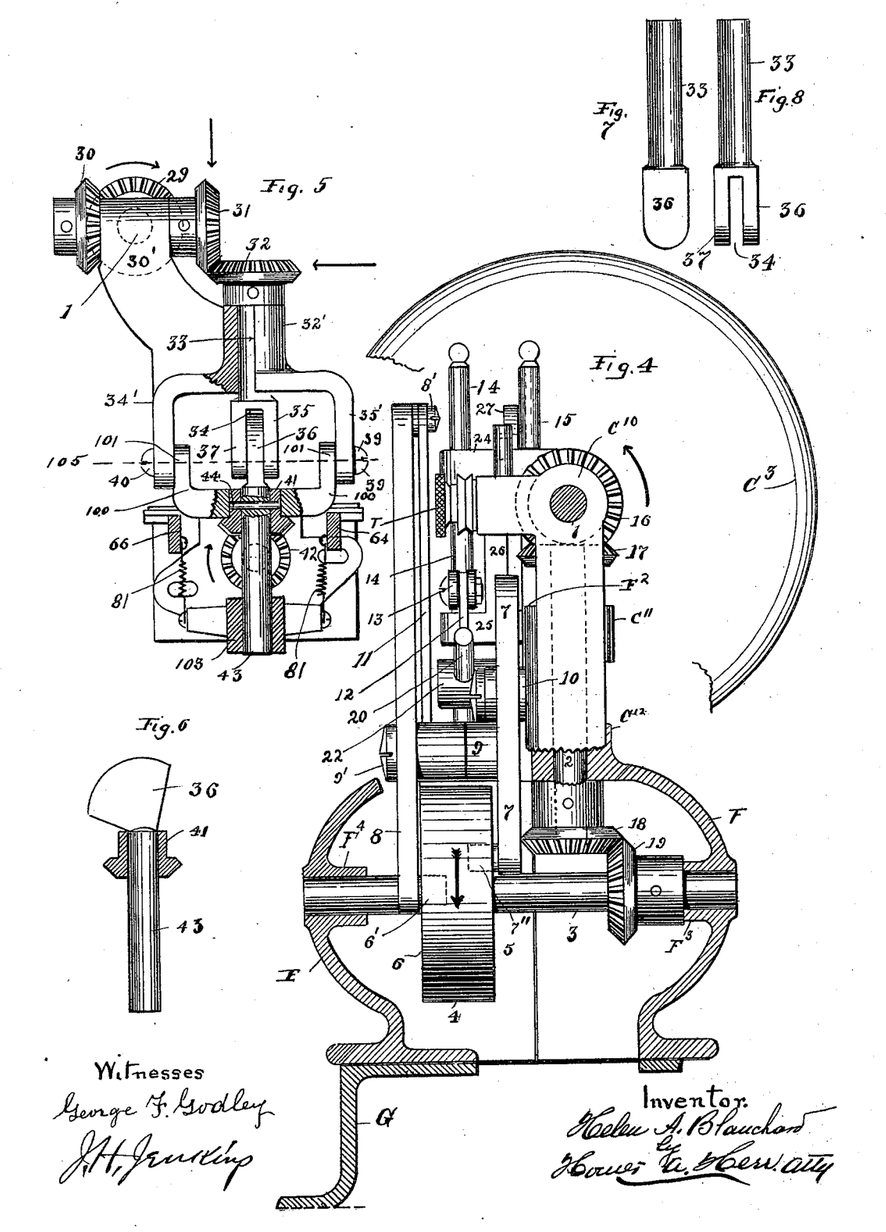
Fig. 4 is a vertical section through the bearings of the needle cam-shaft and end elevation of a part of the machine with the balance and belt wheel omitted.
Fig. 5 is a part vertical section on the line $x^7 x^7$ of Fig. 1 and part end elevation of the machine. The different arrows in this view indicate the direction in which the different gears rotate.
Fig. 6 is a detail, being a vertical section through the looper-shaft-actuating gear and a side elevation of its carrying-shaft. This is the vertical shaft carried by the oscillating standard.
Figs. 7 and 8 are different views of the fixed vertical shaft carried by the main standard. It is the immediate actuating member for the shaft shown in Fig. 6.
Figure 9:
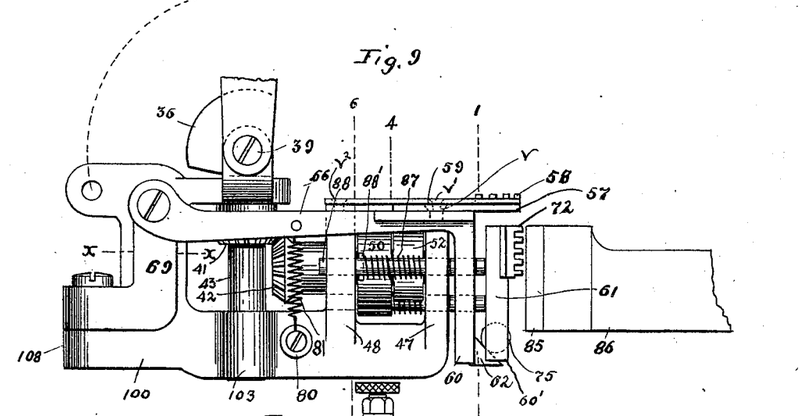
Fig. 9 is an enlarged side elevation of the oscillating frame or standard which supports the looper, hat, and band feeds and their immediate actuating mechanism.
Figure 10:
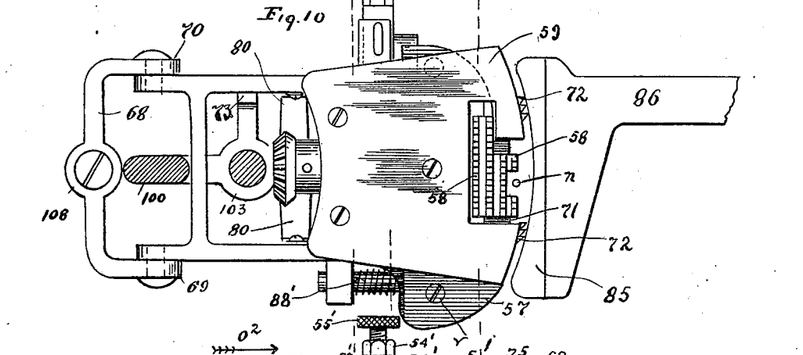

$C^{10}$ and 29' are two rigid or integral projections of the main standard of the machine. These projections serve as bearings for the aforesaid prime shaft 1. 16 is a miter-gear carried by the said shaft. 17 is a follower for said miter, carried by the secondary shaft 2. This secondary shaft is supported in bearings $C^{11}$ and $C^{12}$, integral parts of the main standard $F^2$. 18, Fig. 4, is a miter-gear, also fixed to the said secondary shaft 2. This gear meshes with and actuates its follower 19, carried by the shaft 3. This shaft is held in bearings $F^3$ and $F^4$ and carries the cam-carrying disk 4.

Figures 32, 33, 34, 35, 36, 37, 38, 39, 40:
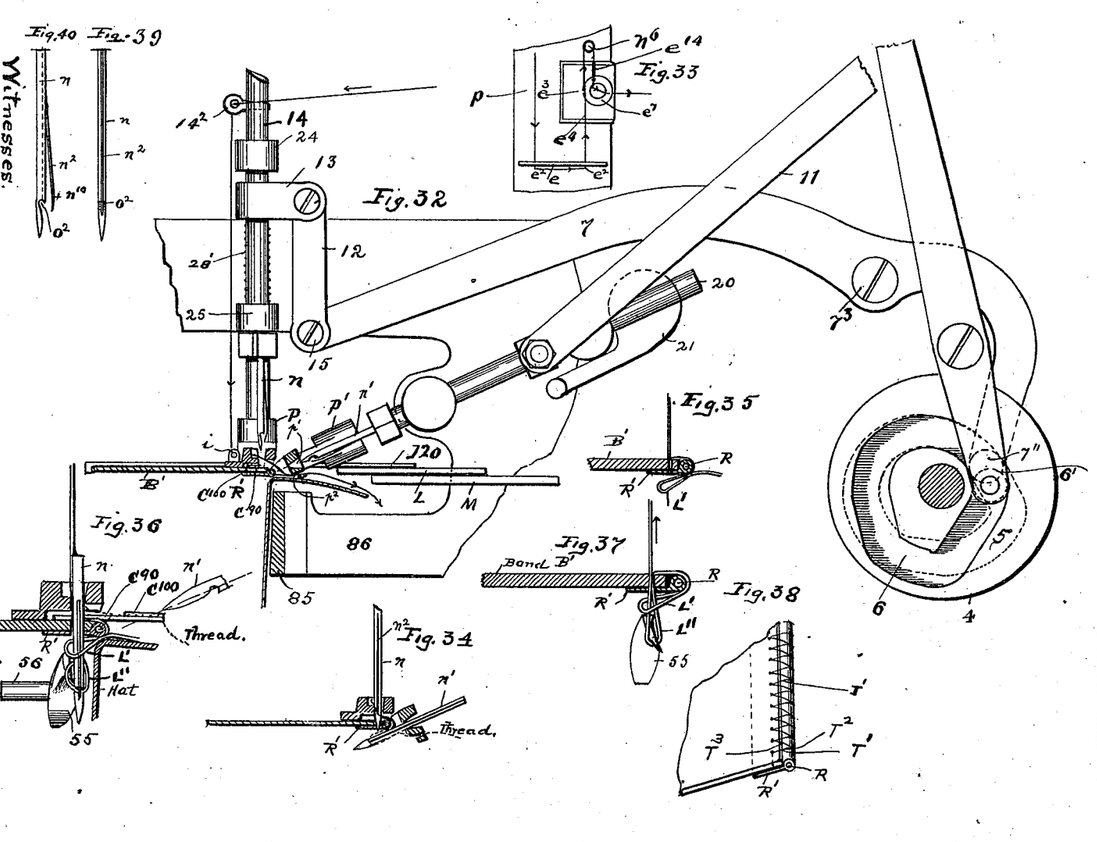
Fig. 32 is a side elevation of the links and arms which serve as the connecting mechanism between the respective needle-rods and their respective actuating-cams; also, a vertical transverse section through the cone-shaped needle-contracting eyes carried by the respective presser-feet; also, a transverse section through the sweat-band, hat-body, reed, and reed-holder, and a side elevation of the sweat-band guide.
Fig. 33 is an enlarged view of a portion of the band presser-foot, showing the approximate position the thread normally occupies across its eye.
Figs. 34, 35, 36, and 37 are views showing different positions of the needle and thread, also looper, during the formation of the overseam and stitch and will be explained more at length hereinafter.
Fig. 38 is the completed overseam.
Figs. 39 and 40 are different views of my needle.

5 is the cam which actuates the vertical needle-bar or the needle-bar which carries the band-penetrating needle. This cam is best shown in dotted lines, Fig. 32. 6 (shown in the same figure) is the cam for actuating the twenty-degree needle-bar or the needle-bar which carries the needle penetrating between the reed-holder and the hat fabric. These cams, as shown in the drawings, are milled from a solid metallic ring or disk 4 aforementioned, and the angular relation they sustain to each other from the basis of relative movement they impart to the respective members they actuate is shown in Fig. 32.

$7''$ is a friction-roller running in the cam 5. This roller is fixed to and oscillates the lever 7 on its pivotal stud $7^3$, held to the lug 10 of the main standard $F^2$ of the machine.

Figures 1, 3:
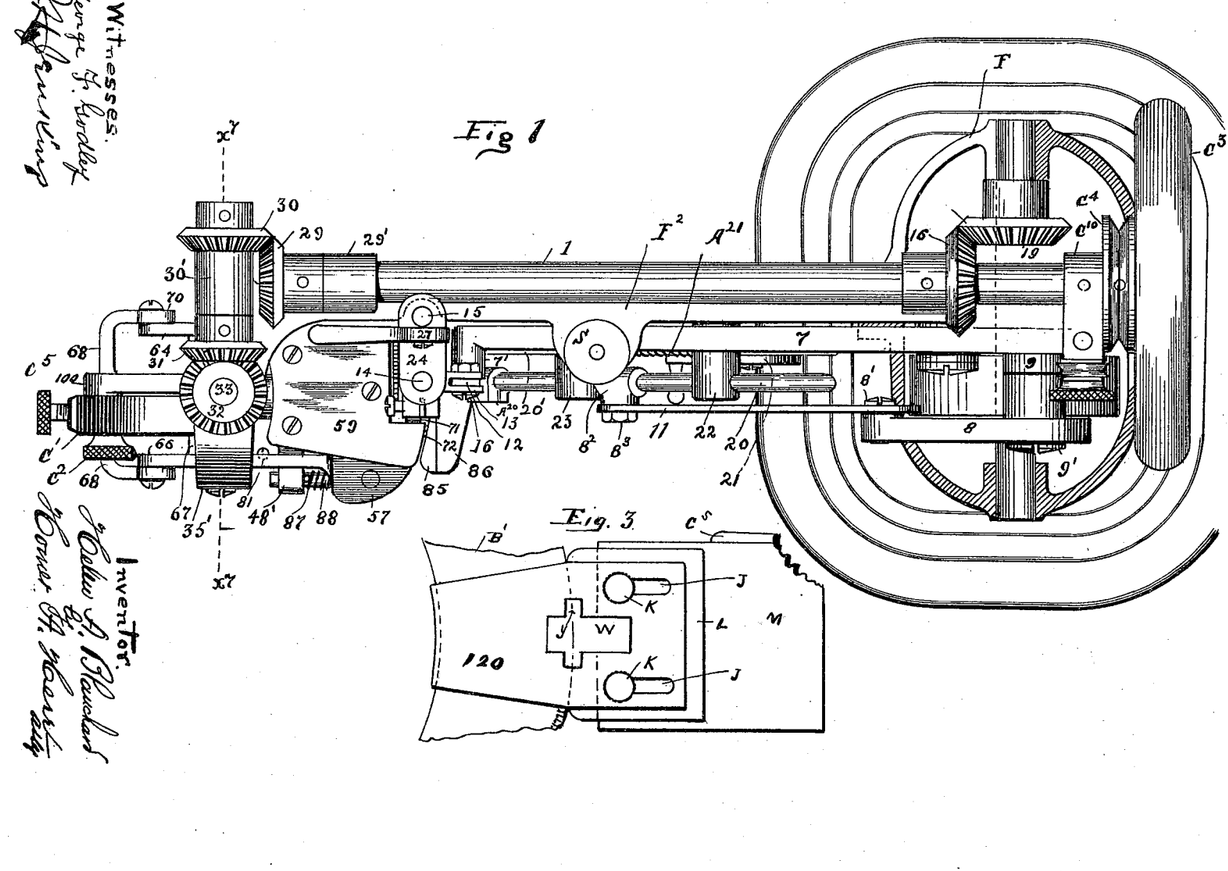
Figure 1 is a general plan of my machine with the band-guide omitted.
Fig. 3 is a plan of the sweat-band guide.

$7'$, Fig. 1, is a lateral and outward projecting lug carried by the lever 7 at its needle end. The link 12 is pivotally held thereto by the stud 15, Fig. 2. 13 is a link-holding arm fixed to the vertical needle-rod 14. The pin or screw 16 holds the said link 12 to the arm 13 aforesaid.

$14^2$ is the thread take-up, carried by the needle-rod 14. $14'$ is the vertical needle-holder, holding the needle to the said bar 14.

$6'$ is a friction-roller running in the cam 6. This friction-roller is fixed to and actuates the lever 8, and the lever 8 is pivotally held to the stud 9 of the main standard of the machine by the screw stud or pin 9.

11 is a link pivotally supported to the lever 8 by the screw-pin $8'$.

Figure 2:
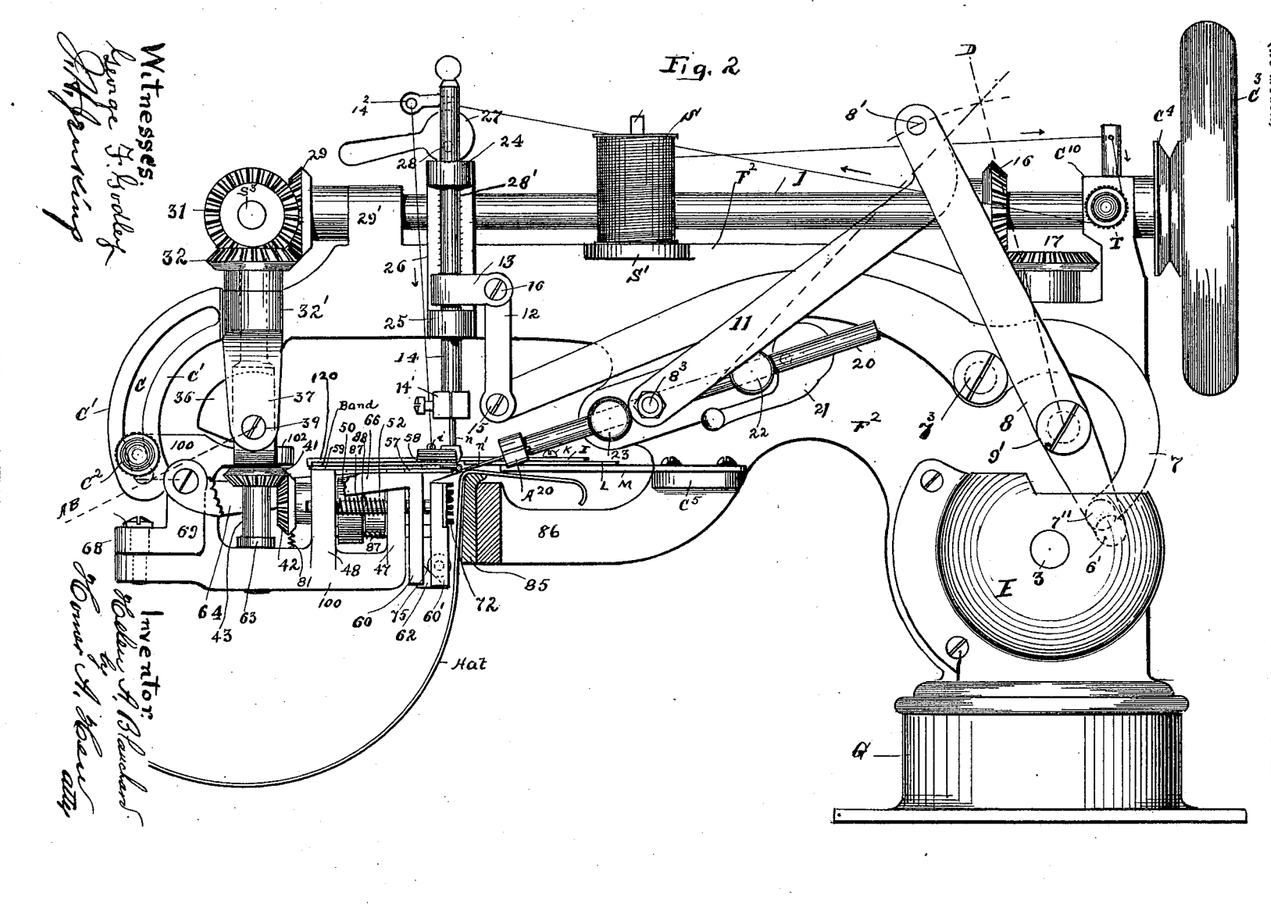
Fig. 2 is a side elevation and transverse vertical section through the hat-guide and its support.

20 is the twenty-degree needle-rod, supporting the needle-holder $A^{20}$, Fig. 2.

22 and 23 are guide-bearings, in which the needle holding and actuating rod 20 reciprocates. These bearings are rigid to or with the main standard of the machine.

$8^2$, Fig. 1, is a link-holder carried by the needle-rod 20. The screw-pin $8^3$ supports the link to this holder.

$15'$ is the sweat-band presser-foot rod, held in its upper position by a cam 27, pivotally held to said rod by a pin 28, Fig. 2. In its downward position while the machine is in operation it is held by a spring $28'$. (Shown rearward of the needle-rod in Figs. 2 and 32.)

Figures 21, 22, 23, 24, 25, 26, 27, 28, 29, 30, 31:
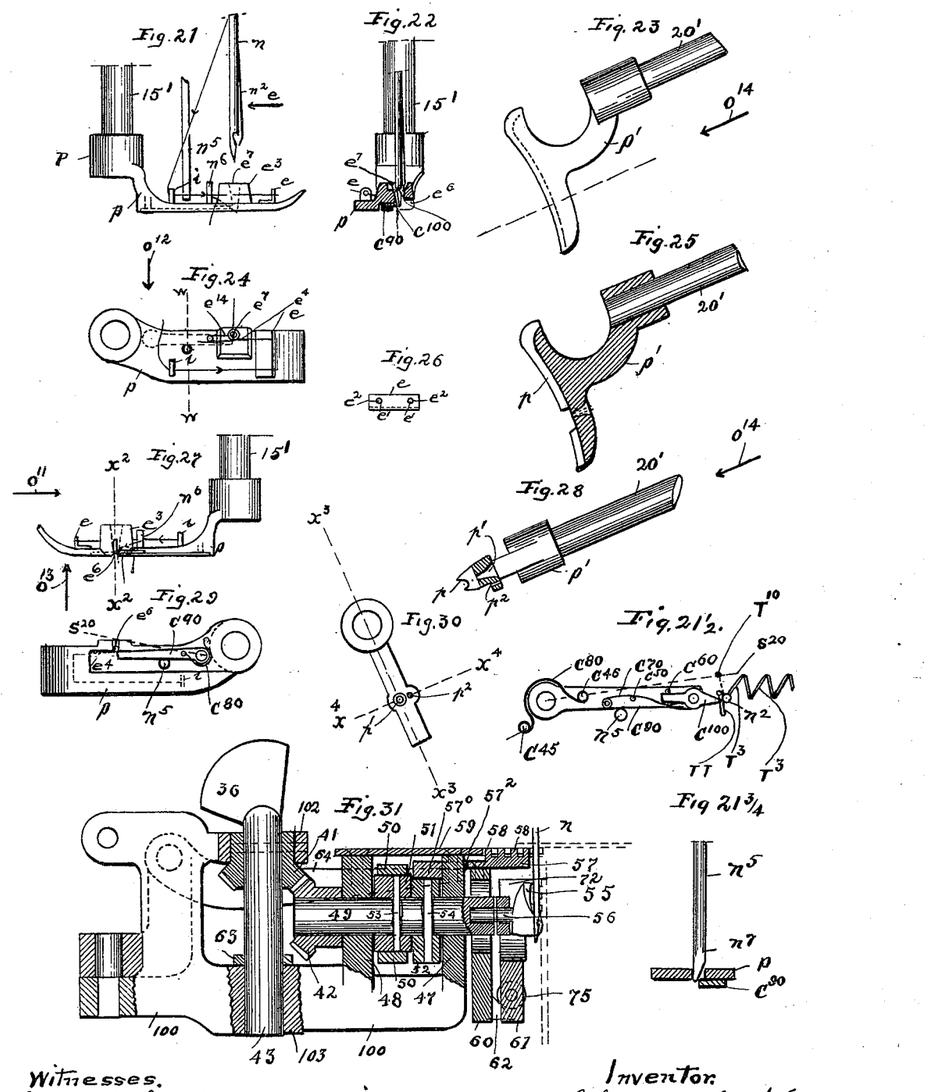
Fig. 21 is a side elevation of the band presser-foot, showing the thread-swinging arm in dotted lines and its actuating member $n^5$. The needle is shown in its upward position in this view.
Fig. 22 is a vertical section on line $x^2 x^2$, Fig. 27, looking in the direction of the arrow $o^{11}$. The vertical needle is here shown as just taking the thread.
Fig. 23 is a plan of the reed-guiding presser-foot.
Fig. 24 is a top plan of the sweat-band presser-foot.
Fig. 25 is a section on line $x^3 x^3$ of Fig. 30.
Fig. 26 is a detail of the slotted thread-guide carried by the band presser-foot.
Fig. 27 is a side elevation of the band presser-foot looking in the direction of the arrow $o^{12}$, Fig. 24.
Fig. 28 is a section on the reed-guiding presser-foot through line $x^4 x^4$, Fig. 30.
Fig. 29 is a bottom plan of the sweat-band presser-foot or looking in the direction of the arrow $o^{13}$, Fig. 27.
Fig. 30 is a plan of the reed-guiding presser-foot or looking in the direction of the arrows $o^{14} o^{14}$, Figs. 23 and 28.
Fig. 31 is a vertical longitudinal section through the mechanism carried by the oscillating standard or frame shown in Figs. 9, 10, and 11.

$20'$ is the rod of the twenty-degree-needle presser-foot, hereinbefore called the "reed-guiding presser-foot." Figs. 23 and 25 show best this presser-foot $P'$ and the reed-guiding groove $p$. A spring $A^{21}$, Fig. 1, holds this presser-foot downward while sewing. In its upward position it is held by a cam 21, Figs. 1, 2, and 32. The rod $20'$ is guided and held by the bearings 22 and 23 aforementioned.

24 and 25 are the two guiding and retaining bearings for the vertical needle-rod 14 and presser-foot rod $15'$. They are integral with a central stem 26 and an integral part of or rigid with the main standard of the machine.

I have now described how I reciprocate my needle-holding bars, and I will now proceed to describe my looper and feed actuating mechanism.

29 is a miter-gear carried by the prime shaft 1. At the opposite end from the belt-wheel 30, Fig. 1, is its follower. This follower is fixed to and actuates a shaft $S^3$. (Shown best in Fig. 2.) $30'$ is the bearing for this shaft. This bearing is an integral part of the main standard of the machine. 31 is a miter-gear also rigidly fixed to the shaft $S^3$, and 32 is its follower.

33, Figs. 5 and 1, is the supporting-shaft for the follower 32, and $32'$ is the bearing for this shaft. Integral with this bearing, and therefore with the main standard of the machine, are two depending arms $35'$ and $34'$. (Shown in Figs. 1, 2, and 5.) The centers of these arms are in a vertical plane through the center transversely of the vertical shaft 33, and they serve as the pivotal supports for the frame 100, which carries the looper and the hat and band feeds as well as their actuating mechanism. 101 and 101 are two upward-extending arms, integral members of the said frame 100. These arms are pivoted to the aforementioned depending arms $34'$ and $35'$ and are held thereto by the pins 40 and 39, respectively.

41 is a miter-gear fixed to the shaft 43. At its upper end this shaft is held in bearings 102 and at its lower end it is supported by the bearing 103. Both of these bearings are rigid and integral with the said pivoted frame 100. The shaft 33 at its lower end carries two expanded and coinciding arms 35 and 37. A slot 34 is thus formed and intervenes therebetween. The shaft 43 at its upper end carries an integral flattened head or plate 36, Figs. 2, 5, and 6. These two shafts are in direct alinement, and the head 36 of the shaft 43 oscillates in the slot 34, formed by the inner faces of the arms 37 and 35. The dotted line 105 indicates the pivotal center of these members during any oscillation of the frame 100.

It will be understood that every time a hat is put into the machine the frame 100 and of course the mechanism it carries will be oscillated from the position shown in Fig. 2 until the shaft 43 occupies a position as about indicated by the dotted line A B, Fig. 2. This is necessary to permit the placing of the hat-rim over and around the guide and thrust plate 85 and the supporting-arm 86 therefor. After the hat is placed in the machine, as shown in section, Fig. 2, the arm or frame 100 is again oscillated to its normal position, as shown in Fig. 2, and so remains during the process of sewing the band to the reed-holder.

When inserting the hat in the machine, it is of course imperative that the reed-holder carried thereby shall be placed on the upper side of the plate 59, that the band B' can be conveniently applied thereto. Figs. 2 and 32 best explain this position. As the hat and band are fed around this same plate automatically lifts the reed-holding band to its proper position for sewing, and the band-guide 120 and reed-guiding groove $p$ of the reed-guiding presser-foot coact to hold the band and reed in their correct relative position for a proper union.

During the operation of inserting a hat in the machine it is desirable to hold the mechanism carried by the frame 100 against movement. I therefore provide an arc-shaped slot C, formed by walls C' C', Figs. 1 and 2. A locking-screw $C^2$ will hold this swinging frame in any desired position within the range of its possible movement as predetermined by the length of the arc C. To lock the said frame firmly during the operation of the machine, I have a locking-screw $C^5$. (Shown only in Fig. 1.) This latter screw is designed to engage the screw $C^2$, so it cannot possibly slip in the arc C after the mechanism is primarily adjusted. While I show these two coacting screws as a means for locking the frame 100 to a fixed position while sewing, I do not want it understood that I limit myself to their use. Any lock that will hold this frame 100 fixed and rigid during the operation of sewing and permit of the oscillation of the said frame when the hat is withdrawn is within the scope of my invention. It is evident that during the swinging of the frame 100 the flattened end 36 of the shaft 43 will remain in continuous contact with the aforesaid slot 34 of the shaft 33, as the arc $c$ will not permit of sufficient movement of said frame to disengage the end 36 from its retaining-slot. Thus is the looper and feeding mechanism for both the band and hat kept in working time with the needles regardless of intermittently swinging the same from a normal to an abnormal position.

42 is a follower for the miter-gear 41. This follower is fixed to the shaft 49. (Best shown in Fig. 31.)

47 and 48 are two laterally-projecting bearings or standards integral with the body 100 of the oscillating frame aforementioned.

Figures 14, 15:
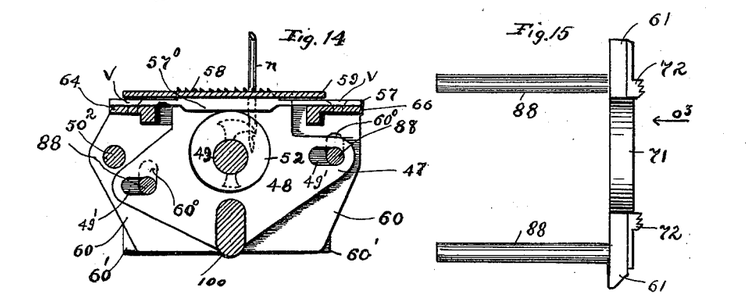
Fig. 14 is a transverse vertical section on line 3 4 of Figs. 9, 10, and 11 looking in the direction of the arrow $o^2$ at Fig. 11.
Fig. 15 is a plan of the hat-feed and supporting-rods therefor.

52 is a cam carried by the shaft 49. (Best shown in Figs. 2, 11, and 14.) As seen in Fig. 14, this cam is in its highest position and in contact with the cam-face $57^0$ of the band-feed plate, and in this position the teeth 58 of this feed-plate are impacted into the under side of the band, as shown in Fig. 2. The feed has now gripped the band and fixedly holds it to move pursuant to the motion of the feed. On consulting Figs. 9, 10, 14, and 16 it will be seen this band-feed is fixed rigidly by screws $v$ $v$ to the frame 66 64, and on consulting Figs. 9, 10, 11, and 1 it will be seen the arms 66 and 64 of this frame are pivotally held to upward-extending arms 69 and 70 of an integral pivoted support therefor, 68. The frame having the arms 66 and 64 therefore is free to oscillate vertically, and therefore the gripping movement of the band-feed is accomplished by the cam 52.

It is absolutely necessary that the gripping functions of the sweat-band and hat-body should be accomplished simultaneously. Having described how I accomplish the former, I will now detail how the latter is done.

Figure 13:
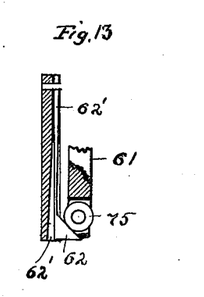
Fig. 13 is a section on line $x^8 x^8$ of Fig. 12, showing the friction-roller on the hat-feed-carrying frame and the actuating spring-cam therefor.

Integral with the arms 64 and 66 of the feed-plate-supporting frame is a depending plate flange or lug 60. This plate carries two spring-cams 62. (Best shown in section, Fig. 13, but shown also in Figs. 2, 9, and 11.) These cams lie in slots 62', Fig. 13, and are of course yielding.

61 is a plate supporting two steel and toothed jaws 72 72, Figs. 1, 2, 9, 10, 11, 13, 15, and 17. Friction-rollers 75 75 are carried by this plate. (See Figs. 9, 11, and 13.) On these friction-rollers the aforesaid spring-cams 62 play. Now the laterally-projecting arms 47 and 48 of the frame 100 carry slots 49' 49', Figs. 14 and 16. In these slots the rods 88 88, rigid with the hat-feed-carrying plate 61, reciprocate longitudinally. These slots, it will be seen, are horizontal. Therefore the frame 61 can have no vertical movement. Now as the depending flange 60 of the arms 64 and 66 is raised by the cam 52 during the gripping operation of the band-feed, as described, the cams 62 62 will also be raised and simultaneously therewith, and as the frame 61 or its supporting-rods 88 88 cannot rise vertically they will be moved forward horizontally, and the hat will be engaged by the teeth 72 72 and forced against the guide and thrust plate therefor, 85. The band and hat are now firmly gripped and rigidly held, and at this point the machine is timed to operate the needles, which will be explained in describing the operation of the machine hereinafter.

Figure 11:
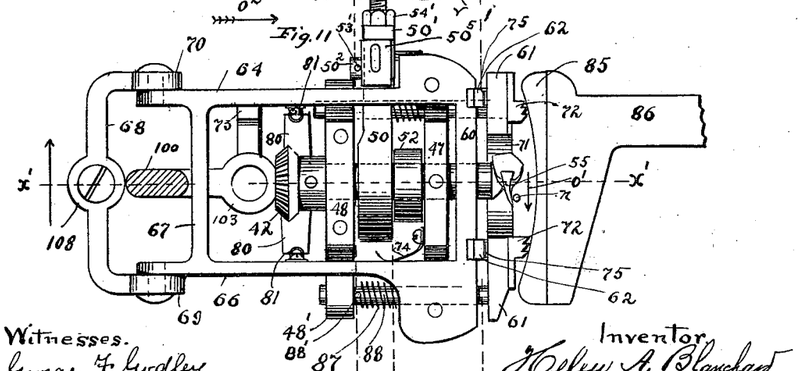
Fig. 11 is a plan of the actuating mechanism for the band and hat feeds. The band plate and feed are, however, omitted from this view.
Figure 12:
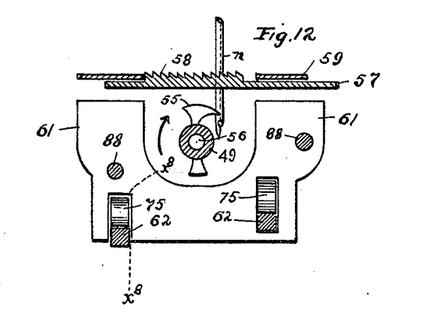
Fig. 12 is a transverse vertical section on line 1 2, Figs. 9, 10, and 11. The looper is shown in this view just in the act of taking the loop from the vertical needle.
Figures 16, 17, 18, 19, 20:
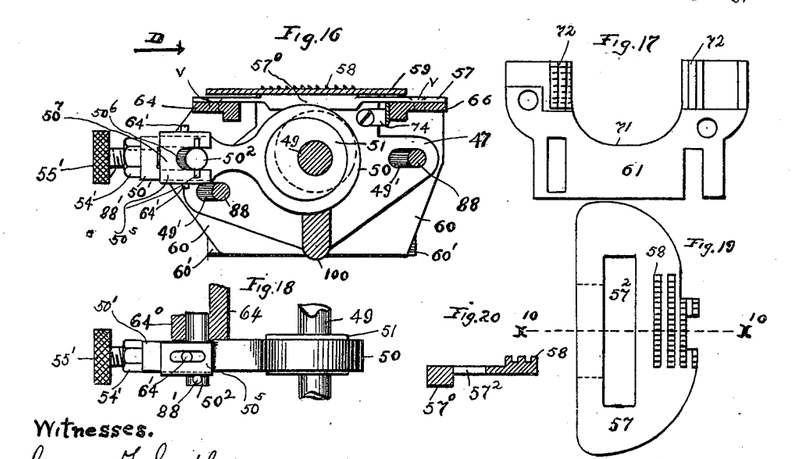
Fig. 16 is a transverse vertical section on line 5 6, Figs. 9, 10, and 11, looking in the direction of the arrow $o^2$ and shows the cam for feeding forward the feeds and the means for regulating the stroke thereof and thereby the length of the stitch.
Fig. 17 is a front elevation of the hat-feed looking in the direction of the arrow $o^3$, Fig. 15.
Fig. 18 is a detail plan of the stitch-regulating mechanism and actuating-cam therefor.
Fig. 19 is a plan of the band-feed plate.
Fig. 20 is a transverse section on line $x^{10} x^{10}$, Fig. 19.

By consulting Fig. 14 it will be seen the plate 60 has two vertical slots $60^0$ $60^0$. Thus is permitted a vertical oscillation of the said plate and its rigid connection, the band-feed plate 57. The said band-feed plate has a rectangular slot, as shown best in Fig. 19 at $57^2$, also Fig. 31. This slot receives the upper end of the standard 47 of the frame 100 and permits the said plate to move independent of the fixed position of the said frame. 59, Figs. 10 and 11 only, shows a fixed stop, against which the arm 64 of the band-feed plate is normally held by the spring 74. (Shown in Figs. 11 and 16 only.) While the employment of this spring and stop are not absolutely necessary, they are desirable, holding the hat and band feeders rigid during the operation of the needles. The springs 81 81 pull the arms 64 and 66, to which they are attached, downward, and therefore keep the cam-face $57^0$ of the band-feed plate in close and perpetual contact with the cam 52. The springs 87 on the rods 88 of the hat-feed-carrying frame disengages the said feed from the hat after the frame 60 is drawn down by the action of the springs 81. It will thus be seen that the releasing of the hat and band feeds from the hat and band are also simultaneous. Immediately after the band and hat have been engaged, as described, by their respective feeds the parts are so timed that the cam 51 oscillates the feed-carrying frame 64, 66, and 60 to the degree predetermined by the adjustment. This movement determines the length of my stitch. It is accomplished by the following mechanism: $50^2$ is a stud-pin fixed to the lateral projection $64^0$, Fig. 18, of the arm 64. This lug could be also secured to the depending flange or plate 60. Its mere local position is not material so long as it is rigidly connected with the frame which carries the band-feed and therethrough operatively connected with the hat-feed. 50 is an eccentric-strap carried by the cam 51, and the cam 51 is pinned to the shaft 49. These parts are best shown in Figs. 11, 16, 18, and 31. $50^5$, Figs. 11, 16, and 18, is an adjustable thrust-cap carried by the arm 50' of the eccentric-strap 50 aforesaid. A slot $50^6$, Fig. 16 only, in the end of the arm 50' of the eccentric-strap permits the stud $50^2$ to pass therethrough, and a lug $50^7$, Fig. 16, (shown in dotted lines,) passes inward and through the said slot $50^6$ also. This lug receives the thrust or, more properly, strikes against the pin $52^2$ when the arm 50' is reciprocated in the direction of the arrow D, Fig. 16. 64' 64' are two guide-pins for the movable cap $50^5$ and hold the said cap in a fixed lateral position on the arm 50'. The screw 55' is a regulating-screw for the said cap $50^5$, and when I wish to shorten my stitch I turn this said screw so it will permit of increased movement of the lug $50^7$ of the cap, and it being evident the more the said cap slides on its guide-pins 64' the less the feed-actuating frame is moved, and vice versa. 54 is a locking-nut for the feed-adjusting screw 55'. The slots 49' 49' permit the hat-frame-supporting rods 88 88 to slide laterally during this feeding operation and also to return to normal position thereafter. The pivotal joint on which the mechanism oscillates horizontally during this feeding operation is shown at 108 in Figs. 2, 9, 10, and 11.

I, Figs. 2 and 3, is the upper and outer guide-plate for the hat-band. L is the inner end guide-plate. M is the supporting-plate for these two guides, which is in turn supported on the lug $c^5$, an integral projection of the main standard $F^2$ of the machine. Y and W indicate a hole in the aforesaid guide-plates through which the band presser-foot through which access is had to the band and also through which the reed-guide has access to the reed, as shown only in Figs. 32 and 3.

K K are two adjusting-screws for regulating the band guide-plate 120 and L.

As a single thread is employed in my machine and this thread must be held in a uniform position across the eye of my sweat-band presser-foot and the spool end of the thread at the formation of each stitch must be carried to the intersecting path of the twenty-degree needle in the formation of the overseam, my presser-feet must be of special construction. Figs. 21, $21\frac{1}{2}$, $21\frac{3}{4}$, 22, 24, 26, 27, and 29 illustrate special features of my sweat-band presser-foot. P is the bed-plate of this presser-foot; $i$, the primary thread-guide carried by this presser-foot. $e$ is a plate either rigid with or integral with the body of the presser-foot and carried on the upper side thereof lateral to the eye-carrying lug $e^3$. $e^7$ is the needle-contracting eye in this lug. The thread-plate $e$ has two thread carrying or guiding holes $e'$ $e'$ and two thread-inlet slots thereto $e^2$ $e^2$, Figs. 26, 24, and 23. $e^4$, Fig. 29, is a longitudinal slot in the upper side of the lug $e^3$ of the presser-foot. $e^{14}$, Figs. 33 and 24, is a second slot therein parallel to the said slot $e^4$, and $e^6$, Figs. 22 and 27, is a transverse slot connecting with the said longitudinal slot $e^{14}$, but on the under side of the presser-foot, making thereby substantially a right-angular slotted thread-guide when viewed in plan, one of the lines of the angle being on the upper and the other on the under side of the bed-plate $p$ of the presser-foot. The slot $e^{14}$ aforementioned is on alinement with the outer side of the needle-contracting eye $e^7$. The thread is held by and in this slot after passing around the turning stud or pin $n^6$ and guided across the cone-shaped needle-contracting eye $e^7$ in its passage to the slot $e^6$, Figs. 21, 22, and 32. Thus is the thread continuously held in the path of the vertically-reciprocating needle $n^2$. After the thread has been taken by the needle $n^2$ and before the twenty-degree needle has passed between the hat-body and reed it is necessary for me to carry the spool end of the thread in the path of the said twenty-degree needle, so that it can be taken by this latter needle and thereby passed through and between the reed and hat-body, and thus form the first thread of the overseam. This is the thread marked T' in Figs. $21\frac{1}{2}$ and 38. Immediately following the gripping of the thread by the needle $n^2$ the cam end $n^7$ of the rod $n^5$ contacts with the side of the oscillating plate $c^{90}$, as shown only in Figs. $21\frac{3}{4}$ and 24, and the said plate is oscillated from the position shown in the solid drawing, Figs. 29 and $21\frac{1}{2}$, to the dotted line $s^{20}$ in the same figures. $C^{100}$ is a pawl carried by the arm $C^{90}$ at its needle end. This pawl contacts with and swings the thread and carries it beyond the point $T^{10}$. (Shown in Fig. $21\frac{1}{2}$.) At this point the twenty-degree needle takes the thread, and of course the thread-carrying pawl must pass beyond it. The cam-carrying rod $n^5$, as has been explained, forces the arm $C^{90}$ in its thread-carrying movement. It also retains this arm beyond the path of the twenty-degree needle until the vertical needle ascends, and as the vertical needle and cam-rod $n^5$ are fixed to or controlled by the needle-rod 14 when this rod ascends the cam $n^7$, Fig. $21\frac{3}{4}$, is disengaged and the spring $C^{80}$, Fig. $21\frac{1}{2}$, forces the arm $C^{90}$ back to its normal position and ready for the next thread. When the feeding mechanism feeds the fabric forward, the thread being carried by the presser-foot $p$ is dragged on the under side thereof the length of one stitch, and thus is formed the thread $T^3$ of the overseam, Figs. $21\frac{1}{2}$ and 38. $C^{46}$, Fig. $21\frac{1}{2}$, is a pin against which the spring $C^{80}$ presses, and $C^{50}$ is a spring of like function for the spring $C^{70}$, and $C^{60}$ is a pin against which the dog $C^{100}$ normally rests. $C^{45}$ is a pin which holds the spring $C^{80}$ to the bed-plate of the presser-foot.

$p$, Figs. 25 and 28, is the reed-guide. This guide is arc-shaped longitudinally and semicircular in cross-section, conforming to the curvilinear shape of the hat-crown in its longitudinal circle and the approximate diameter of the reed in its transverse curve. This presser-foot therefore holds the reed R and its holder R' at the proper and uniform distance from the vertical needle. It also carries a needle-contracting eye $p'$, as well as the initial threading-hole $p^2$. The thread-contracting eye of this twenty-degree needle is preferably so arranged that the point of the needle will have passed therein and through before the needle spring-finger will contact therewith and impinge the point. To this end the shoulder on the spring-finger carried by this needle is or should be thrown somewhat farther from the point than is the shoulder carried by the needle-spring $n^2$. Figs. 39 and 40 are views of my vertical needle. $n$ is the needle proper; $o^2$ an offset carried thereby near the point, and $n^2$ a spring-finger normally distended from the point thereof. As the needle descends the notch $o^2$ therein engages the thread. Immediately thereafter the spring-finger $n^2$ at its part $n^{10}$ contacts with the inner tapering wall of the eye $e^7$, carried by the presser-foot, and its point thereupon impinges the point of the needle, forming thereby a closed thread-retaining eye. Both needles operate in substantially the same way, differing only in the position of the curve $n^{10}$ on the twenty-degree needle, as has been just explained.

Having now described the construction of my machine, its operation is as follows: In Fig. 2, S shows the thread-carrying spool, the arrows the direction in which it is delivered from the spool through the tension I, take-up $14^2$, and to the primary thread-guiding eye $i$ of the sweat-band presser-foot. It is then drawn through the presser-foot, according to the position of the arrows shown in Fig. 33, and in first threading the machine finally pulled or put through the eye $p^2$ of the reed-guide presser-foot. This completes the threading of the machine. The hat is now placed in the machine, care being taken that the reed-holder R' is placed on the upper side of the plate 59, as shown in Figs. 2 and 32. The sweat-band B' is now placed in its guides 120 and L and the guides adjusted to the width of the sweat-band. It will of course be understood that prior to putting the band in its guides the frame 100 and the mechanism it carries will be oscillated to and locked in the position shown in Fig. 2. The needle $n$ now moves downward to the position it occupies in Fig. 34 and rests. It has now gripped the thread, and the eye is formed whereby the thread is retained. Meanwhile the rod or arm $n^5$, Figs. 21, $21\frac{1}{2}$ and 27 only, carried by the needle-carrying rod 14, has engaged its cam end $n^7$, Fig. $21\frac{3}{4}$ only, against the arm $C^{90}$ of the presser-foot $p$, Figs. $21\frac{1}{2}$, 27, and 29 and in dotted lines in Fig. 24, being under and oscillated the said arm from the position shown in the solid drawings in Figs. $21\frac{1}{2}$ and 29 to that indicated by the dotted radial line in the same figures, $S^{20}$. This brings the thread T T, Fig. $21\frac{1}{2}$, in the path of the needle $n'$ and under the needle-contracting eye $p'$, with the dog $C^{100}$ of the arm $C^{90}$ beyond and rearward of the point $T^{10}$, Fig. $21\frac{1}{2}$, where the needle intersects and grips the thread, where it remains until the cam $n^7$ releases the arm $C^{90}$, which is done when the vertical needle ascends, as has been before intimated. It is of course evident in this oscillation of the arm $C^{90}$ the thread is engaged by the said dog $C^{100}$ and carried thereby in the manner and to the position just described. This thread is held by the dog aforesaid until it is taken by the twenty-degree needle, and the descending of this needle brings a tension on the thread sufficient to pull or slip it off the inclined point of the dog, thus permitting the free formation of the loop between the hat-crown and reed-holder, as will be presently detailed. After the vertical needle has taken the thread and rested and the thread has been carried to and by the point $T^{10}$, Fig. $21\frac{1}{2}$, as above described, the twenty-degree needle $n'$, Fig. 32, moves forward and downward between the hat-body and reed, traversing its limit of stroke uninterruptedly. The position this needle now occupies is shown in Fig. 34. The needle $n$ has remained at rest during this entire forward movement of the needle $n'$. The said twenty-degree needle $n'$ has taken the thread and carried it to the position shown in the dotted line, Fig. 34. Needle $n'$ now recedes slightly, just sufficient to form a loop open, as shown in Fig. 35, and then rests. After the formation of this loop L', which is properly the secondary loop in the function of sewing, the vertical needle $n$ starts again and passes down and through this loop, and rests after slightly receding to form its loop L''. The twenty-degree needle $n'$ now moves back to normal, and the vertical needle N now holds the loop L', formed thereby. The parts are so timed that the looper 55, while the needle $n$ is yet at rest, engages the loop L'' and takes it therefrom, as shown in Figs. 36 and 37. The vertical needle now proceeds back to its normal position. The take-up $14^2$ acts and draws the loop L' taut around the loop L'', making a tight overseam-thread, as shown,

T' T', Fig. 38. The looper 55 I employ is of the well-known chain-stitch-forming type, and the primary loops L" are the loops that are interlocked or chained together in the well-known way of chain-stitches. Now it will be remembered the sweat-band presser-foot is the thread-carrier. Therefore as the fabric is fed from under the presser-foot the thread is carried with it; but as the locked end of the thread is on the under side of the reed-holder R' and reed R (this being the thread T' of the overseam) as the fabric is fed from under the presser-foot after the formation of a stitch the fabric end of the thread will swing with the point T², Fig. 38, substantially as a pivot. Thus do I get my diagonal overseam-thread T³, same figure, on the needle n again descending. It will thus be seen my twenty-degree needle does not penetrate the hat fabric or reed-holder, but passes between the bastings which hold the reed-holder and reed to the hat-crown.

While I speak of and show my feeding and looper actuating mechanism as mounted on a pivoted standard, I do not want it understood that I confine myself to this structure. I could carry these parts on the main standard and swing the thrust-arm 86 instead if I choose, but prefer the former arrangement.

I could make numerous other structural modifications without departing from the spirit of my invention and do not confine myself to those specifically shown.

Having now described my invention, what I claim as new, and desire to secure by Letters Patent, is—

1. The combination in a sewing-machine for sewing the sweat-band to the reed-holder of a hat of a vertical reciprocating thread-gripping needle, a secondary reciprocating thread-gripping needle inclined thereto, means for carrying the thread from the path of the primary to the path of the secondary needle, a thread-holder, a thread-guide, means for expanding and contracting said needles respectively during their thread taking and releasing functions, and a looping device.

2. The combination in a sewing-machine for sewing the sweat-band to the reed-holder of a hat, of a primary reciprocating thread-gripping needle, a secondary reciprocating thread-gripping needle inclined thereto, means for actuating said needles in predetermined order, means coacting with the needles to insure their thread-gripping function, a sweat-band-supporting plate, a hat-guiding plate, a reed-guide and a needle coacting looper, whereby the hat band and reed are at all times during the operation of sewing held at the proper relative position.

3. The combination in a sewing-machine for sewing the sweat-band to the reed-holder of a hat, of a hat-support, a sweat-band and reed-holder supporting means, two reciprocating thread-gripping needles inclined toward each other, a thread-guide, a thread-holder, means coacting with the needles, thus adapting them to engage the thread on their downward motion and shed the thread on their return stroke, means for carrying the thread from the path of one needle to the path of the other and a needle coacting looping device.

4. The combination in a sewing-machine for sewing the sweat-band to the reed-holder of a hat, of a sweat-band presser-foot, a needle coacting eye carried thereby, an expandible thread-gripping needle adapted to contact with said eye during its thread-gripping function, means for holding the thread normally across said eye in the path of said needle, a secondary thread-gripping needle, a secondary presser-foot carrying a needle-contracting eye, said eye coacting with said needle during its thread-gripping function, means for carrying the thread from the path of one to that of the other needle, and a looper.

5. The combination in a sewing-machine for sewing the sweat-band to the reed-holder of a hat, of a hat-support, a sweat-band support, a reed-guide, a band-guide, a hat-feeding mechanism and an independent sweat-band and reed-holder feeding mechanism.

6. The combination in a sewing-machine for sewing the sweat-band to the reed-holder of a hat, of a hat-support, a hat-guide, a hat-feed, a reed-holder guide, a band and reed-holder support, a band and reed-holder feed, a band-guide and means for variably adjusting the band-guide, as set forth.

7. The combination in a sewing-machine for sewing the sweat-band to the reed-holder of a hat, of two reciprocating thread-gripping needles inclined toward each other, means for carrying the thread from one needle to the other, two coacting presser-feet, one for each needle, means for actuating said needles in predetermined order, a hat-feed, a band-feed, a reed-holder feed, a looper, a main fixed standard for the support of the needles and their actuating mechanism and a portable standard for the support of the looper, hat and band feeds and their local actuating mechanism.

8. The combination in a sewing-machine for sewing the sweat-band to the reed-holder of a hat, of a hat-support, a supporting-frame therefor, two reciprocating thread-gripping needles inclined toward each other also carried thereby, means for carrying the thread from the path of one needle to that of the other, a sweat-band and reed-guide likewise supported thereon, a looper, a hat-feed, a sweat-band feed and independent means for supporting the looper, hat and band feeds, as set forth.

9. The combination in a sewing-machine for sewing the sweat-band to the reed-holder of a hat of a band-guide, a band-feed, a hat-feed, a fixed hat-guiding thrust-plate acting as a presser-foot for the hat-feed, means for actuating said hat and band feeds simultaneously during their respective gripping functions, and means for actuating said feeds simultaneously during their feeding functions, as set forth.

10. The combination in a sewing-machine for sewing the sweat-band to the reed-holder of a hat, of a band-guide, a band-feed, a hat-feed, a hat-guiding thrust-plate, means for operating said hat and band feeds simultaneously during their feeding function but independently and means for adjusting the throw of said feeds whereby a single adjustment will control the length of feed for both band and hat.

11. The combination in an overseam-forming sewing-machine of two reciprocating thread-gripping needles inclined toward each other a thread-guide, means adapted to coact with said needles during their thread-gripping function, a thread-swinging device, a looper, means for actuating said thread-swinging device and said looper, whereby immediately following the gripping of the thread by the one needle the thread-swinging device throws the spool end of the thread in the path of the secondary needle, permitting it to be gripped thereby, thus forming one of the threads of the overseam, and whereby the loop formed by the secondary needle is transferred to the primary needle and thereafter shed to a loop formed by said primary needle.

12. The combination in an overseaming sewing-machine of a vertical reciprocating thread-gripping needle, a thread-carrying presser-foot a second reciprocating thread-taking needle inclined to the said former needle, means carried by the presser-foot and coacting with the said vertical needle insuring its thread-gripping function, means for feeding the spool end of the thread from the path of the one to that of the other needle means for returning said thread-feeding means to its normal position and a needle coacting looper.

13. The combination in an overseaming sewing-machine of a vertical reciprocating expandible needle, normally disengaged from its thread a presser-foot, a needle-contacting eye carried by said presser-foot and coacting with said needle during its thread-gripping function, means for holding the thread normally across said needle coacting eye, a vertical needle-carrying bar, a second needle inclined to the said former needle, fabric-feeding devices, actuating mechanism therefor, means for carrying the thread from the vertical needle to the path of the said secondary needle, a looper, looper-actuating mechanisms, whereby the thread is caught by the vertical needle, then the spool end thereof is placed in the path of the secondary needle, the secondary needle thereupon forming one of the threads of an overseam and a secondary loop, and whereby the said secondary loop is transferred to the said vertical needle and the looper then engages the loop formed by the primary needle and locks it to its functional successor.

14. An overseaming mechanism for a sewing-machine comprising two reciprocating thread-gripping needles inclined toward each other, a rotating looper and means for feeding or carrying the spool end of the thread from the path of one to the path of the other needle, whereby the one needle grips the thread and said feeding means feeds the said thread to the path of the other needle, a secondary loop is then formed and transferred to the primary reciprocating needle, thus forming an overseam, and the loop formed by the primary needle is engaged by the looper and locked thereby to its functional successor.

15. The combination in a single-thread sewing-machine of a presser-foot, a thread-taking and thread-shedding needle, means coacting with the needle rendering it automatic in its threading function and an auxiliary needle and coöperative overedging and stitch-forming mechanism, said auxiliary needle operating at an incline to the former and said overedging mechanism carrying the thread from the former to the latter needle and means coöperating with the former needle for taking and holding the said needle-loop until the formation of the next stitch as and for the purpose set forth.

16. A single-thread whip-stitch-forming mechanism consisting of two thread-gripping needles normally disengaged from the thread inclined toward each other a threaded presser-foot, a second presser-foot for the second of said needles means coacting with the presser-feet whereby the thread-gripping function is assured, fabric-feeding devices, means for controlling the spool end of the thread whereby the primary cross-thread of the whip-stitch is formed by the said thread-controlling device and the secondary cross-thread is formed by the feeding of the fabric and a looper.

17. A whip-stitch-forming sewing-machine having two thread-gripping needles normally disengaged from the thread and inclined toward each other, means coacting with the needles whereby their thread-gripping function is assured before fabric penetration means for holding the thread in the paths of said needles and a looper as and for the purpose set forth.

18. A sewing-machine adapted to sewing the sweat-band to the reed-holder of a hat comprising two thread-gripping needles means coöperating with the needles whereby their thread-gripping function is assured, means for holding the thread in the path of said needles and a looper, one of the said needles carrying the thread through and between the hat-body and reed, the other through the reed and hat-sweat and whereby they have their loops thereafter united into a continuous chain.

19. In a machine for sewing hats the combination with means for supporting the hat, of alternately-operating needles one inclined with relation to the other and means for holding the thread in the path of the needles said needles engaging the same thread at different points to form loops, means for operating the needles, and a loop-taker and means for operating the same.

20. The combination with means for supporting the article to be sewed, of companion needles disposed relative to said supporting means so that one carries the thread outside of the edge of said article and the other carries the thread through the article and also through the loop formed by the first-named needle, the portion of thread between the loops overseaming the edge of the article, means for operating the needles, means for guiding a thread across the path of the needles, and a looper and means for operating the same.

21. In a hat-sewing machine, the combination with means for supporting the hat, and guides for the sweat-band and reed, of companion needles so disposed relative to said supporting means that one passes outside of the guide and between the reed and hat-body and the other passes through the guide, said needles converging toward a point beneath the guide whereby one loop is carried through the other and the reed is overseamed, means for guiding a thread across the path of the needles, means for operating the needles, and a looper and means for operating the same.

22. In a sewing-machine, stitch-forming mechanism including alternately-operating needles and means for actuating said needles, means for conducting a single line of thread across the path of movement of each needle whereby the said needles successively engage the thread before needle penetration, said needles shedding the thread after loop formation, and a looper and means for operating the same.

23. In an overseam hat-sewing machine and in combination with means for supporting the hat stitch-forming mechanism including a plurality of needles adapted to engage a single thread, means for disposing said thread in the path of said needles a looping mechanism, feed mechanism, and presser-feet one of which serves as a guide for the hat-reed.

24. In a hat-sewing machine, the combination of companion needles and means for operating the same, means disposing a thread in the path of said needles a looper and means for operating the same, means for supporting the hat with an attached reed, means for supporting a sweat-band, a feed mechanism for the hat, and an independent feed mechanism for the sweat-band, and means for operating said feed mechanisms in unison.

25. The combination with means for operatively supporting the hat and a reed attached to said hat, of stitch-forming mechanism including a reciprocating needle, a second needle inclined with relation to the first-named one, means disposing a single thread in the path of said needles so that it may be alternately engaged and released by said needles, means for alternately operating the needles, and a rotary looper and means for operating the same.

26. The combination with stitch-forming mechanism including companion self-threading and self-shedding needles, and companion presser-feet having means for guiding the thread and holding it in the path of said needles whereby double loops are formed from the single thread, and a loop-taker and means for operating the same.

27. The combination with companion needles and means for alternately operating the same, of companion presser-feet having needle-eyes, means for guiding and holding the thread across said eyes whereby the needles alternately engage and shed the thread, and a looper and means for operating the same.

28. In a sewing-machine, stitch-forming mechanism including companion needles one inclined with relation to the other, means guiding a single thread across the path of the needles, means for alternately operating the needles, whereby a loop formed by one needle is penetrated by the other needle, a looper, and means for operating the same.

29. The combination of means for supporting a hat, means for supporting a sweat-band, alternately-operating notched needles, one of said needles inclined with relation to the other means for holding a thread in the path of the needles whereby said thread is engaged by each needle and automatically released by the needles after loop formation, means for operating the needles, and a looper and means for operating the same.

In testimony whereof I affix my signature in presence of two witnesses.

HELEN A. BLANCHARD.

Witnesses:
H. A. HERR,
JOSHUA R. MORGAN.